Oct. 4, 1927.
A. W. HAMM
WAGON CHUTE
Filed Oct. 2, 1926
1,644,521
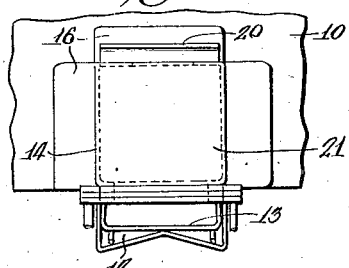
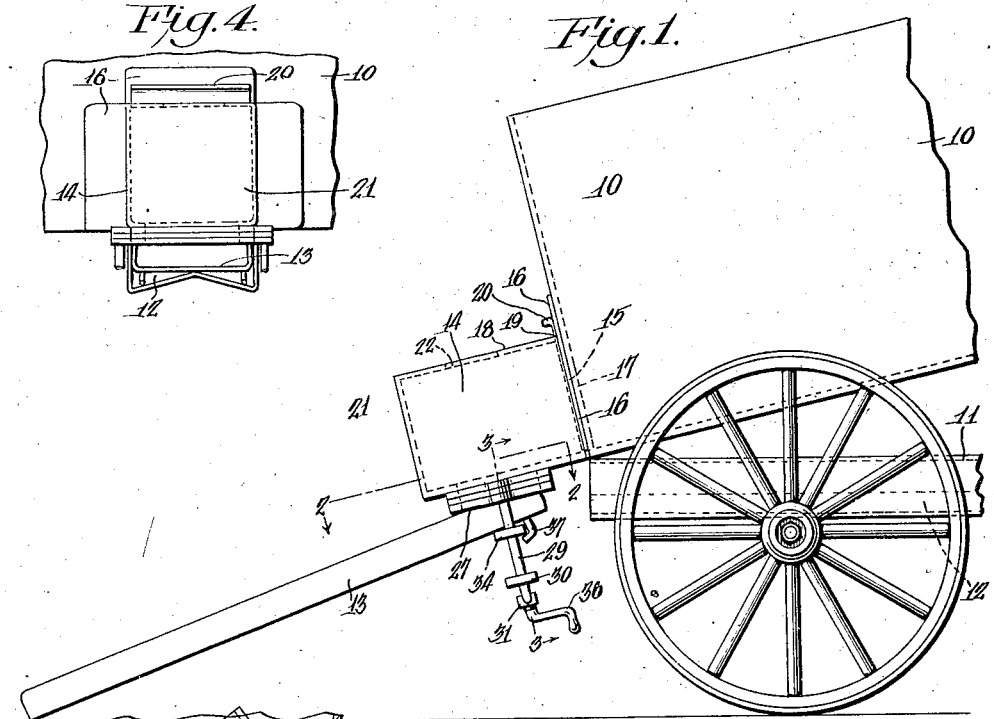
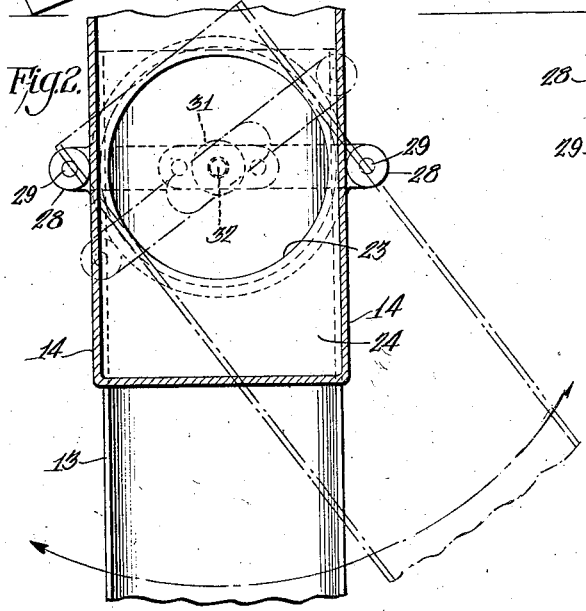
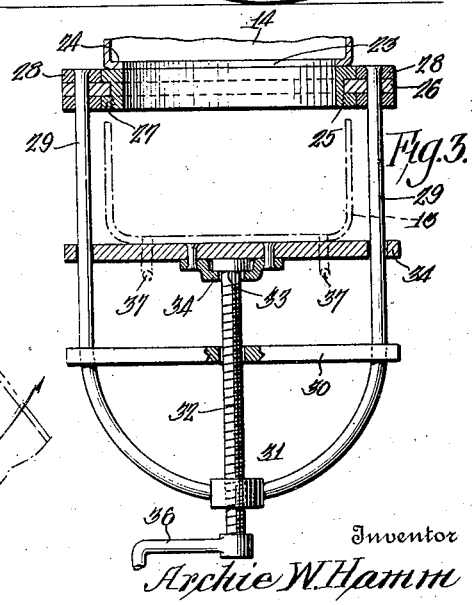
Inventor
Archie W. Hamm
Attorney Patented Oct. 4, 1927.

1,644,521

UNITED STATES PATENT OFFICE.

ARCHIE W. HAMM, OF PHILADELPHIA, PENNSYLVANIA.

WAGON CHUTE.

Application filed October 2, 1926. Serial No. 139,108.

This invention relates to wagon chutes, and more particularly to a device which is disposed on the rear or unloading end of a vehicle adapted for carrying coal or analogous material. The object of the invention is to provide a vehicle which is adapted for carrying coal or the like, with a chute unloading structure adapted to provide means for unloading the material to a point at right angles to the vehicle body or parallel therewith.

Another object of the invention is to provide a wagon chute as specified, which is adapted to be disposed longitudinally under the vehicle body when not in use, and when required the chute may be extended and positioned longitudinally with the vehicle or at right angles to either side of the vehicle body for directing the material to be unloaded to the rear or to either side of the vehicle, and provided with means for securing the chute in an adjusted position.

A further object of the invention is to provide a device of the character described, which is simple in construction, inexpensive to manufacture, readily accessible, easily adjusted and highly efficient for the purpose for which it is intended.

Other objects of the invention will appear in the following detail description, and in the accompanying drawings wherein:

Figure 1 is a side elevation of the device attached to a vehicle.

Figure 2 is a top plan view of the device attached to a vehicle.

Figure 3 is a longitudinal sectional view on the line 3—3 of Figure 1.

Figure 4 is a partial end elevation of the chute structure.

Referring more particularly to the drawings, the improved wagon chute comprises the superstructure or carrying body 10 which is disposed on a rectangular vehicle extension frame 11, and said frame is secured to the chassis of the vehicle and adapted to provide a receiving chamber 12 for the chute 13, when it is not in use. Secured to and extending rearwardly of the body 10, on the longitudinal center line thereof, is an oblong hopper 14 having an open abutting end 15 which is provided with angular outwardly extending flanges 16 for securing the hopper to the rear end of the carrying body 10. The said rear end is provided with a rectangular aperture 17 for registration with the open abutting end 15 of the hopper 14. Adjacent to the securing and abutting end 15 of the hopper 14 in the upper face 18 thereof, is an oblong slot 19 adapted to receive a slidable partition member 20 for closing the rectangular aperture 17 in the end of the carrying body 10. Also intermediate the open inner end 15 and the outer closed end 21 of the hopper 14, in the upper face of said hopper, is an opening 22 adapted to have inserted therein, a rod or the like, for dislodging the material for free passage down through the outlet opening 23 in the lower or bottom face 24 of the hopper 14. Said outlet opening 23 is provided with a concentric shouldered and threaded downwardly extending member 25, which is adapted to receive a rotatable collar 26. Said collar is held in place thereon by a suitable threaded ring nut 27 which is threaded to the lower end of the concentric member 25.

Secured to the outer periphery of the rotatable collar 26, by means of suitable lugs 28, are a pair of downwardly extending guide rods 29 which have rigidly secured therebetween, adjacent the lower ends of said rods, a spacing plate or link 30, and said guide rods curving inwardly below the spacing plate 30 and the ends thereof secured to a centrally disposed threaded nut 31. Said nut 31 adapted to receive the locking screw rod 32 which extends upwardly through the spacing plate 30, and the upper free end 33 of said screw rod 32 pivoted to a locking plate 34, which is suitably apertured at its ends for slidable engagement of said locking plate on the guide rods 29 in the space between the cylindrical outlet member 25 and the rigidly secured spacing plate 30. The locking plate 34 is adapted to hold the chute 13, in locked position against the underside of the ring nut 27 when the chute is disposed in an inoperative position, by means of the screw rod 32 and the screw rod rotating handle or wheel 36. Said slidable locking plate 34 is also adapted for engagement thereon, of a pair of hooks 37 which are disposed on the underside of the chute 13 adjacent the closed rear end of said chute.

The receiving chamber 12 for the chute 13 which is disposed centrally in the rectangular extension frame 11, and under the carrying body 10, is of rectangular formation with its bottom side constructed to provide for slidable engagement on the chute 13.

From the foregoing description, taken in connection with the drawing, it will be readily apparent that when it is desired to unload a supply of material, the vehicle so equipped is drawn alongside the curb of a street, and facing with traffic. The body 10 is then raised on its rear end in the usual manner, and the chute 13 is then released and extended until the hooks 37 engage on the slidable locking plate 34. The chute is then swung into a position at right angles to the side of the vehicle nearest to the curb and again secured by means of the screw rod 32 and the handle or wheel 36 therefor. It is obvious that the chute may be extended at right angles to the other side of the vehicle or may be extended rearwardly and parallel with the vehicle. The partition 20 is then withdrawn from the slot 19 in the hopper 14, permitting the coal or like material, to pass freely onto the chute and thence to the unloading point.

It is, of course, to be understood, that the invention may be constructed in various other manners, and the parts associated in different relations, and therefore, I do not desire to be limited in any manner, except as set forth in the claims hereunto appended.

What I claim is:—

1. The combination with a vehicle body adapted to be inclined from front to rear, of a hopper rigidly secured to the rear of said body, a rectangular opening in the rear end of said body for registering with the open abutting end of said hopper, an understructure between the vehicle body and chassis therefor for normally housing a chute, a pair of attaching hooks on the closed end of said chute, a rotatable collar pivoted to the underside of said hopper, a pair of guide rods extending downwardly from said rotatable collar, a cross bar secured to the free ends of said guide rods, said cross bar provided intermediate its ends with an internally threaded boss for receiving a locking screw, a chute securing cross bar disposed on the free end of said locking screw and adapted for slidable movement on and between the said guide rods, and a removable partition vertically disposed in said hopper for releasing the contents of said vehicle body.

2. The combination with a vehicle body adapted to be inclined from front to rear, of a hopper rigidly secured to the rear of said body, a rectangular opening in the rear end of said body for registering with the open abutting end of said hopper, an understructure between the vehicle body and chassis therefor for normally housing a chute, a pair of attaching hooks on the closed end of said chute, a rotatable collar pivoted to the underside of said hopper, a pair of guide rods extending downwardly from said rotatable collar, a cross bar secured to the free ends of said guide rods, said cross bar provided intermediate its ends with an internally threaded boss for receiving a locking screw, hand rotating means on the lower end of said locking screw, a chute securing cross bar disposed on the free end of said locking screw and adapted for slidable movement on and between the said guide rods, a removable partition vertically disposed in said hopper for releasing the contents of said vehicle body, the upper face of said hopper having an opening provided with means for dislodging the material from the corners of said hopper.

In testimony whereof I affix my signature.

ARCHIE W. HAMM.